United States Patent Office 3,432,456
Patented Mar. 11, 1969

3,432,456
POLYURETHANES PREPARED FROM DIHYDRAZIDES
Harald Oertel and Heinrich Rinke, Leverkusen, and Wilhelm Thoma, Cologne-Flittard, Germany, assignor to Farbenfabriken Bayer Aktiengesellschaft, Leverkusen, Germany, a German corporation
No Drawing. Filed Aug. 8, 1961, Ser. No. 129,964
Claims priority, application Germany, Aug. 12, 1960, F 31,869
The portion of the term of the patent subsequent to Feb. 21, 1984, has been disclaimed
U.S. Cl. 260—30.2       12 Claims
Int. Cl. C08g 22/04, 53/14, 53/16

ABSTRACT OF THE DISCLOSURE

Polyurethane polymer solutions and fibers, foils and coatings obtained from the solutions are prepared by reacting in a polar solvent that will dissolve polyacrylonitrile (1), a substantially linear isocyanate terminated polymer having a molecular weight of from about 700 to about 5,000 and prepared by reacting (a) an excess of an organic diisocyanate with (b) an organic compound containing reactive hydrogen atoms that are reactive with —NCO groups with (2) a dihydrazide having at least two active hydrogen atoms and the formula R—NH—NR'—A—(Z—A)$_n$—NR'—NH—R wherein A is —CO—, —CS—, or —SO$_2$—, R and R' are hydrogen, alkyl or aryl, Z is alkylene, arylene, cycloalkylene, —NH—, —NH—NH—, —OYO—, or

—NH—Y—NH— wherein Y is alkylene or phenylene and $n$ is 0 to 1, the dihydrazide (2) being present in a quantity of from about 100 mol percent to about 110 mol percent of that required to react with the NCO groups of the linear isocyanate terminated polymer (1).

---

This invention relates to a method for making highly elastic shaped elements and more particularly to a method of making polyurethane fibers, foils, and coatings.

It has been heretofore known to react an isocyanate-modified polyhydroxy compound with a glycol, a diamine or water in the presence of a solvent and to shape the resulting solution into a foil or fiber. The reaction with diamines results in articles having good elastic properties, however, it is extremely difficult to carry out this reaction on a commercial scale because of the extremely high reaction velocity between isocyanates and amines which frequently leads to premature gel formation of the solution.

It has also been known to react a dicarboxylic acid dihydrazide or a carbodihydrazide with a diisocyanate. The polycondensates thus obtained do not possess the highly elastic properties of known polyurethanes or polyureas. Further, the thermal instability of these polycondensates make it necessary to carry out the reaction in a solvent. When an attempt is made to conduct this reaction on a commercial scale, the low solubility of the resulting polycondensates present great difficulties and the solutions prove to be unstable.

It has also been known to prepare casting compositions by reacting at high temperatures isocyanate modified polyesters with compounds such as, dihydrazides, substituted-bis-semicarbazides, and dioximes to obtain elastomeric shaped elements after a relatively long final heating at about 100° C. This process does not lend itself to the production of filaments or foils for the reason that the long heating time necessary to cure the castings cannot be applied to the preparation of filaments or foils on the commercial scale. Moreover, these casing compositions are made with an excess of polyisocyanate. Even if the reaction is performed in two steps the sum of isocyanate groups altogether is an excess over the hydrazide groups. The resulting cross-linked plastic is no longer soluble. The final chemical reaction is done after the film or foil has been formed, that is after or at least during the elimination of the solvent in case the casting is made in solution.

It is therefore an object of this invention to provide an improved method of making polyurethane fibers, foils and coatings. It is another object of this invention to produce polyurethane fibers, foils and coatings having excellent elastic properties. It is still another object of this invention to provide a method of making polyurethane fibers, foils and coatings from readily defoamable stable solutions. It is a further object of this invention to provide a method of making highly elastic filaments having very high tensile strength, high elongation, low permanent elongation and a high modulus. It is a still further object of this invention to provide a method of making a clear, highly elastic polyurethane foil having high tensile and tearing strength. It is still another object of this invention to provide a method of making polyurethane coatings having good bonding power, high elasticity, good resistance to abrasion and good light fastness. It is still another object to provide a storage stable composition for the preparation of polyurethane fibers, foils and coatings, which composition is not subject to premature gel formation. It is still another object of this invention to provide for a chemical reaction in solution in which the product is held after the reaction has been finished and from which the final shape may be given to the product without further chemical reaction.

The foregoing objects and others, which will become apparent from the following description, are accomplished in accordance with the invention, generally speaking, by providing a method for making highly elastic fibers, foils and coatings by the polyisocyanate polyaddition process wherein a substantially linear isocyanate-modified organic compound containing active hydrogen atoms which are reactive with —NCO groups and having a molecular weight of from about 700 to about 5,000 and terminal NCO groups is reacted in an inert solvent with a solution of a dihydrazide having the general formula R—NH—NR'—A—(Z—A)$_n$—NR'—NH—R wherein A is a group selected from CO, CS and SO$_2$; R and R' each represent a hydrogen atom, an alkyl radical or an aryl radical, with the proviso that at least twice in the molecule R and R' represent a hydrogen atom; Z is an alkylene radical, the chain of which may be interrupted by one or more hetero atoms such as oxygen and sulfur, an arylene radical, an aralkylene radical, an NH— or NH—NH group, an O—Y—O or an NH—Y—NH group, wherein Y in the last two formulae is a divalent organic radical, and $n$ is an integer selected from 0 and 1, the dihydrazide being employed in a quantity of from 100 mol percent to about 110 mol percent of that required to react with the —NCO groups present and thereafter removing the solvent from the solution while affecting shaping into the desired final object. This procedure produces in a short time solutions having a concentration permitting deformation into shaped articles such as filaments and foils which exhibit excellent elastic properties.

Any suitable organic compound containing active hydrogen atoms which are reactive with —NCO groups and which are determined by the Zerewitinoff test may be reacted with an organic polyisocyanate to produce an isocyanate-modified compound for use in the process of this invention such as, for example, hydroxyl polyesters, polyester amides, polyhydric polyalkylene ethers, polyhydric polythioethers, polycarbonates, and polyacetals. These compounds, having terminal hydroxyl groups and substantially linear structure, should have a molecular weight of from about 700 to about 5,000 and a melting point preferably lower than 60° C. and even more preferably lower than 45° C. for the reason that the elastic properties, especially at low temperatures, decrease because of hardening.

Any suitable hydroxyl polyester may be used for the preparation of the isocyanate modified active hydrogen compound, such as, those prepared from dihydric alcohols and dicarboxylic acids. Any suitable dicarboxylic acid may be used such as adipic acid, glutaric acid, azelaic acid, sebacic acid, nonane-dicarboxylic acid, thiodipropionic acid, pimelic acid, ricinoelic acid, suberic acid, fumaric acid, maleic acid, phthalic acid and the like. Any suitable dihydric alcohol may be used such as, for example, ethylene glycol, 1,3-propylenediol, dimethyl propane-1,3-diol, 1,4-butanediol, 1,6-hexanediol, 2,5-hexanediol, 1,10-decanediol, thiodiglycol, diethylene glycol, triethylene glycol, 4,4'-dihydroxy dicyclohexyl dimethyl methane, N-methyl diethanolamine, and the like. Further suitable polyesters can be obtained from caprolactones and glycols such as 1,4-butane diol.

Owing to the greatly improved resistance to hydrolysis, the polyesters prepared from glycols having at least 5 carbon atoms and which are transformed with less than equivalent quantities of diisocyanates into polyester urethanes are preferred. A typical example of such a composition is a polyester of hexanediol and adipic acid having a molecular weight of 1,000 which is transformed with ½ mol of toluylene diisocyanate into a polyester urethane having a molecular weight of about 2,200. Of course, mixtures of the aforementioned polyester starting materials may be employed.

Any suitable polyester amide may be used such as those prepared by the incorporation of amino alcohols, amino carboxylic acids and polyamines into the formulations for hydroxyl polyesters set forth above. Any suitable amino alcohols such as, for example, ethanol amine, propanol amine and the like may be used. Any suitable polyamine such as, for example, toluylene diamine, hexanediamine, piperazine, and the like may be used. Any suitable amino carboxylic acid such as, for example, ω-amino caproic acid and ω-amino undecanoic acid and the like may be used.

Any suitable polyalkylene ether may be used in the preparation of isocyanate modified active hydrogen containing compounds in accordance with this invention such as the reaction product of any of the above-mentioned polyhydric alcohols with alkylene oxides such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols, and the like. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers, Inc. (1951) or in U.S. Patent 1,922,459.

Any suitable polyhydric polythioether may be used such as, for example, the condensation product of a thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable polyacetal may be used such as, for example, the reaction product prepared by reacting an aldehyde with a polyhydric alcohol. Any of the polyhydric alcohols mentioned above may be used. Any suitable aldehyde may be used such as, for example, formaldehyde, polymers of formaldehyde, acetaldehyde, butyraldehyde and the like. The polyacetals described in German patent specification Nos. 1,039,744 and 1,045,095 are suitable for use in the preparation of the isocyanate modified polyhydroxy compound in accordance with this invention. Any of these compounds containing active hydrogen containing groups when reacted with an excess of an organic polyisocyanate are suitable in the practice of this invention to prepare isocyanate modified polyhydroxy compounds.

Any suitable hydroxyl-terminated polycarbonate such as, for example, those set forth in Canadian Patents 578,585, 578,795, and 594,805 may be used. Further, the polycarbonates obtained from cyclic carbonates and glycols and those hydrocarbon polymers which contain small quantities of hydroxyl groups can likewise be used as starting materials.

The polyhydroxy compounds can be used singly or mixtures thereof can be reacted with diisocyanates, it being prefered to use 1.75–4 mols and preferably about 2 mols of diisocyanate per mol of polyhydroxy compound. In this case, with a molar ratio of polyhydroxy compound to diisocyanate between 1:2, compounds are formed with which there is still a certain linking of the individual molecules of the polyhydroxy compound, but free —NCO groups occur at the ends.

With a molar ratio of exactly 1:2, merely the ends of the chains of the polyhydroxy compounds are provided by way of urethane groups with free —NCO groups, whereas with molar ratios greater than 1:2, free diisocyanate is present in addition to those compounds of high molecular weight which carry isocyanate groups. This reaction can be effected in known manner by dehydrating the polyhydroxy compound by heating it for approximately one hour in vacuo at 130° C. and reacting the dehydrated polyhydroxy compound with the diisocyanate at an elevated temperature of, for example, from 80° C. to 130° C. Alternatively, a solution of the diisocyanate in an inert solvent such as methylene chloride, acetone or benzene may be added to the polyhydroxy compound. The temperature of the mixture is slowly raised while distilling off the solvent and the reaction is allowed to proceed for a sufficient time (about 1–2 hours) at an elevated temperature (preferably 90° C. to 110° C.).

The reaction may also be effected in the presence of a small quantity of a trifunctional alcohol (less than 5% of the OH number of the polyhydroxy compound), such as trimethylol ethane or trimethylol propane or trifunctional isocyanates, in which case the reaction should lead only to such weakly branched products that a gel formation does not occur.

Any suitable organic diisocyanate may be used in the process of this invention to produce isocyanate-modified polyhydroxyl compounds such as, for example, 1,4-phenylene diisocyanate, 4,4'-diphenyl diisocyanate, 4,4'-diphenyl methane diisocyanate, 4,4'-diphenyl dimethyl methane diisocyanate, dibenzyl diisocyanate, 2,4-toluylene diisocyanate, 2,6-toluylene diisocyanate and mixtures of 2,4- and 2,6-toluylene diisocyanate, 1,4-cyclohexane diisocyanate, hexamethylene diisocyanate, 4,4'-hexahydrodiphenyl methane diisocyanate, naphthalene-1,5-diisocyanate, furfurylidene diisocyanate, 1,5-tetraline diisocyanate, di-(3-isocyanato-4-methyl phenyl)-urea, 3,3'-dimethyl-4,4' - diphenylmethane-diisocyanate, 3,3' - dimethoxy- or 3,3'-dichloro-4,4'-diphenylmethane-diisocyanate, 2,2'-diethyl-4,4'-diphenylmethane-diisocyanate, 3,3' - dimethyl-4,4'-diphenyldiisocyanate, 1-methyl - 3,5 - diethyl- 2,4-phenyldiisocyanate, diphenylether-4,4'-diisocyanate, stilbene diisocyanate, 4,4'diphenylsulfide diisocyanate, xylylene diisocyanate, dicyclohexylmethane diisocyanate and the like. The symmetrical diisocyanates are preferred. The products prepared from 4,4'-diphenyl dimethylmethane diisocyanate and hexamethylene diisocyanate have excellent stability to light.

The substantially linear, isocyanate-modified polyhydroxy compounds are preferably transformed into approximately 50% solutions by the addition of solvents which also dissolve polyacrylonitrile and which are neutral with respect to —NCO groups. The solvent is preferably added at room temperature or at slightly elevated temperature. The resulting solutions are reacted, if necessary after further dilution with a dilute substantially 1–10% solution of the compounds having the aforementioned general formula.

The suitable solvents being known to dissolve polyacrylonitrile are strongly polar liquids and usually contain amido or sulfoxide groups. They exhibit a strong tendency to form hydrogen bonds. They include dimethyl formamide, dimethyl acetamide, dimethyl propionamide, tetramethylene sulfon, N-methyl pyrollidone, dimethyl sulphoxide, hexamethyl phosphorous amide and the like. These solvents may be blended with other solvents such as dioxane, tetrahydrofuran, glycol methylether acetate, ethyl acetate, acetone, chlorobenzene, cyclohexanone, methylene chloride and chloroform, which under the reaction conditions have to be inert to —NCO groups.

Any suitable compound complying with the general formula set forth above such as, for example, carbodihydrazide, N,N'-dimethyl carbodihydrazide, 1,5-diphenylcarbodihydrazide, thiocarbodihydrazide, sulphodihydrazide, dicarboxylic acid dihyrazides (e.g. the dihydrazides of oxalic acid, adipic acid, sebacic acid, thiodipropionic acid, disulphonic acid, such as, 1,3- or 1,4-phenylene disulphonic acid hydrazides), cyclobutane-1,2-dicarboxylic acid dihydrazide, cyclohexane-1,3- and cyclohexane-1,4-dicarboxylic acid dihydrazide, ethylene-bis-semicarbazide, tetramethylene-bis-semicarbazide, 1,4-phenylene-bis-semicarbazide, piperazine dicarboxylic acid dihydrazide, disemicarbazides and dithiodisemicarbazides (e.g., 1,6-hexamethylene bis-semicarbazide), bis-hydrazine carboxylic acid esters of glycols such as 1,4-butanediol, 1,6-hexanaediol or 1,4-phenylene bis-hydroxyethyl ether and N,N'-diaminobiuret and hydrazodicarboxylic acid dihydrazide. Mixtures of dihydrazide compounds can also be used.

In order to regulate the molecular weight of the products obtained by the process according to the present invention, the dihydrazide compounds of the aforementioned general formula may be reacted together with a small quantity, preferably 0.1–4% of a monofunctional acid hydrazide. The use of the dihydrazide compound in a slight excess with respect to the quantity corresponding to the —NCO content results in a product of lower molecular weight. If the dihydrazide compound is employed in a smaller quantity than the equivalent of the —NCO content, products of higher molecular weight are obtained with initiation of cross-linking. An initiation of cross-linking is, however, permissible only to such a degree that the product remains dissolved.

In order to carry out the reaction, a solution of the dihydrazide compound, which may be heated if necessary, is quickly stirred into a thinly liquid solution of the isocyanate-modified polyhydroxy compound which is stirred at high speed. After a short time there is an increase in viscosity with formation of the final product which is of high molecular weight and which contains atom groupings of the following type:

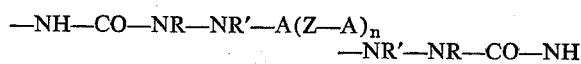

where R, R', A and Z have the meaning set forth above.

A solution of the dihydrazide compound can also be added dropwise to a solution of the isocyanate-modified polyhyroxy compound. Alternatively a solution of the two components may be combined continuously or intermittently in a suitable mixing apparatus. It is also possible to introduce the solution of an isocyanate-modified polyhydroxy compound into a solution of the dihydrazide compound. The solutions which are obtained are clear, colorless, or practically colorless solutions having a viscosity of about 1–800 poises/20° C., a solid content of about 10–40% and are completely stable. In order to obtain products from low viscosity to relatively high viscosity, the solutions can also be concentrated by evaporation, for example at 60–80° C. in vacuo. Pigments and fillers, for example, titanium dioxide, and also light and oxidation stabilizers and heavy metal complex formers can also be introduced into the solutions.

The shaping from the solution can for example be effected by means of nozzles or spinnerets. The solution, for example a dimethyl formamide solution having a viscosity of about 1–800 poises/20° C. is spun into hot water or aqueous solvent mixtures and the filament is allowed to coagulate to its maximum strength, if necessary, by standing in hot water. Alternatively, solutions having a viscosity of 50–800 poises/20° C. are spun through a tunnel having a length of several meters and which is heated to about 150–250° C. The filaments which are formed with evaporation of the solvent are wound, if necessary after injecting talcum into the tunnel and/or after applying talcum. In certain circumstances, the elastomeric filaments can be further stretched to about 1.1–3 times their length over a short heating zone at about 130–200° C., the modulus of the filaments generally rising with decreasing total elongation. By heating to temperatures of about 100–170° C., this stretching or elongation can if necessary be fixed. Generally speaking, however, such an after-treatment can be dispensed with since the products obtained by the present process already have high moduli. The filaments are stable, colorless and, if the starting materials are suitably chosen, they are products which are very resistant to hydrolysis, have an elastic elongation of 400–900%, a relatively high modulus and excellent tensile strength. They are suitable as textile materials since they are resistant to abrasion and are stable with respect to solvents which are used for cleaning fabrics. Furthermore, the combined elastic and mechanical properties of the products are outstanding. For example, they show only a small permanent elongation, only a very small decrease in tension under load, very little "stretch" under a suspended load and a good stress-strain behavior. Since they can be spun in monofilar or multifilar form with high small filament thicknesses from about 4 den. up to filaments of about 500 den., they are very suitable for the manufacture of elastomeric fabrics of low weight and high restoring power, such as are particularly required in the corsetry industry, for the manufacture of medical articles and for many elastic everyday articles such as bathing costumes and sports clothing.

Highly elastic foils can be obtained from the solutions by means of suitable casting devices with evaporation of the solvent. They are clear, light in color, highly elastic with a high modulus, have high tensile and tearing strength and possess a good nontacky surface. Shaped elements can also be produced by dipping processes. By application of the solutions to textile supports and evaporating the solvent, excellent coatings are obtained which are nontacky on the surface, can be deformed with high elasticity and have good resistance to hydrolysis and very good resistance to light. This invention constitutes a very important technical advance over known coatings of polyisocyanates and polyhydroxy compounds from two component systems since coatings are obtained from a stable prepared solution merely by removing the solvent and the problem of the so-called "pot" time is overcome.

The invention is further illustrated by the following examples in which the parts are by weight unless otherwise specified.

EXAMPLE 1

A solution of about 59 parts of 4,4'-diphenyl methane diisocyanate in 250 ml. of anhydrous benzene is added to 300 parts of a polytetramethylene glycol ether having a molecular weight of about 2,540 and an hydroxyl number of 44, the molar ratio being about 1:2. The resulting mixture is stirred on a boiling water bath while passing over nitrogen for about 1 hour with the solvent being distilled off. The mixture is then heated for about 2 hours at about 100° C. The addition product, after cooling to about 40° C. is stirred with about 360 parts of pure dimethyl formamide. The isocyanate content of the solution is about 1.37% —NCO.

About 150 parts of the 50% solution of the polyether isocyanate are diluted with about 200 parts of dimethyl formamide. A solution of about 2.20 parts of carbodihydrazide, which is about an equimolar quantity to the isocyanate compound, in about 110 parts of dimethyl formamide is added at a temperature of approximately about 70° C. while stirring vigorously. The addition is effected within 10 seconds. A short time afterwards, the viscosity of the solution increases and a practically colorless, smoothly discharging, substantially 17% solids, stable solution having a viscosity of 70 poises/20° C. is obtained. This solution can be drawn into filaments.

The solution thus obtained is spun with a delivery quantity of 1.2 ml./min. through a 12-aperture spinneret provided with holes having a diameter of 0.15 mm. into a water bath at a temperature of about 90° C. and having a length of about 2 meters. The highly elastic filament thereby easily obtained is wound onto a spool at a speed of about 10 m./min. After standing in hot water at a temperature of 50–70° C. the filament is dried and shows the following properties:

Count: 98 den.
Tensile strength: 0.80 g./den. related to original count. 8.35 g./den. related to count on breaking.
Elongation: 750%.
Permanent elongation: 2.2% measured after elongation by 100% with an elongation speed of 100% min., loading for two minutes and relaxation for 30 seconds.
Modulus (100%): 0.060 g./den.
Decrease in tension: 8.3% after stretching the filament to 100% with a speed of 100%/min. and a stationary period of 2 minutes.

Even after treatment for 14 hours with boiling, 5% soda solution, the following values are still obtained:

Count: 84 den.
Tensile strength: 0.69 g./den. related to orginal count.
Elongation: 840%.
Permanent elongation: 3.0%.
Decrease in tension: 5.0%.

If the solution is poured onto a sheet of glass, clear colorless films are obtained after drying at about 100° C., these films being of high elasticity, pliability and having nontacky surface properties, and also having very high tensile strength and tearing strength values.

EXAMPLE 2

About 400 parts of the reaction product of 1 mol of a polyester of butane-1,4-diol, hexane-1,6-diol and adipic acid and ½ mol toluylene diisocyanate and having a molecular weight of 2,160 are reacted with about 103 parts of 4,4'-diphenyl dimethyl methane diisocyanate in about 300 ml. of benzene. After distilling off the solvent and thereafter heating for about 2 hours at about 100° C., a polyester isocyanate containing about 2.79% of free isocyanate groups is obtained. After incorporating about 500 g. of dimethyl formamide while stirring, a 50% solution is obtained which contains about 1.36% of —NCO.

To about 150 parts of this solution, after being diluted with about 200 parts of dimethyl formamide, are added all at once and while stirring well, 2.18 parts, the equivalent quantity, of carbodihydrazide dissolved hot in 175 parts of dimethyl formamide. A smoothly running solution which can be satisfactorily stirred is thereby obtained after a short time with an increase in viscosity. The resulting solution has a viscosity of about 115 poises/20° C. and a solid content of about 14.7%.

Spinning is carried out as described in Example 1. Highly elastic 100 den. filaments having a tensile strength of 0.83 g./den., original count, an elongation of 570%, a permanent elongation of 4.9% and a modulus (100%) of 0.062 g./den. are obtained with high spinning certainty.

Foils which are obtained by pouring these materials onto sheets of glass and evoparting off the solvent show an excellent resistance to light and hydrolysis and at the same time have very good elastic properties. Thus, a foil without any additions does not show any discoloration and has an unchanged nontacky surface after being kept for about 110 hours in a "Weatherometer" with simultaneous irradiation with ultra-violet light.

EXAMPLE 3

About 150 parts of the polyester isocyanate solution prepared as described in Example 2 and the —NCO content of which has fallen to 1.18% after standing for 24 hours, are diluted with about 150 parts of dimethyl formamide. About 3.43 parts of adipic acid dihydrazide, a quantity equivalent to the —NCO content, in about 140 parts of dimethyl formamide is added in the form of a practically boiling solution while stirring vigorously and after the first-mentioned solution has been cooled to about +3° C. A completely colorless, approximately 19% solids solution is formed which has a viscosity of 70 poises/20° C. The solution remains colorless and unchanged as regards viscosity after being kept for several months.

The solution is spun into hot water under the conditions described in Example 1, whereby elastic filaments having the following properties were obtained:

Count _____den__ 119
Tensile strength _____g./den__ 0.69
Elongation _____percent__ 540
Permanent elongation _____do____ 6
Modulus (100%) _____g./den__ 0.053

Clear foils having good properties can also be obtained from this solution.

EXAMPLE 4

About 165 parts of an ethylene glycol-adipic acid polyester having an hydroxyl number of 53.5 are dehydrated for about 1 hour in vacuo at about 130° C. and then a solution of about 46.8 parts of 4,4'-diphenyl methane diisocyanate, in a molar ratio 1:2.36 in 250 parts of methylene chloride is added, the solvent is distilled off and thereafter the polyester is heated for about 2 hours at about 100° C. After adding about 635 parts of dimethyl formamide, the —NCO content of the solution is established as being 0.661% —NCO.

About 413 parts of the polyester isocyanate solution are cooled to about +10° C. and a solution of about 3.1 parts of carbodihydrazide and about 0.89 part of hexamethylene-bis-semicarbazide 90% and 10%, respectively, of the quantity calculated on the —NCO equivalence, in about 80 parts of dimethyl formamide is added, the latter solution being at a temperature of about 65° C. The viscosity increases in a short time with a rise in temperature to about 31° C. The substantially 20.6% solids solution thus obtained was spun to give colorless highly elastic filaments having the following properties:

| | | |
|---|---|---|
| Count | den | 182 |
| Tensile strength | g./den | 0.52 |
| Elongation | percent | 682 |
| Permanent elongation | do | 4 |
| Modulus (100%) | g./den | 0.049 |

A foil obtained by casting the solution in a layer with a thickness of 1 mm. and evaporating the solvent shows the following properties, among which the strength value, the modulus and the resistance to further tearing are particularly outstanding:

| | | |
|---|---|---|
| Thickness | mm | 0.18 |
| Tensile strength test (5.2 cm. rod test) | kg./cm.$^2$ | 490–630 |
| Elongation | percent | 710 |
| Tension value at 20% elongation | kg./cm | 10 |
| Tension value at 300% elongation | kg./cm | 150 |
| Resistance to further tearing according to Graves | kg./cm | 50–88 |
| Resistance to tearing by needle test | kg./cm | 63–69 |
| Shore hardness | degrees | 62.7 |

After pouring a sample of the solution into water, washing and drying the precipitated polymer 10 parts of it are dissolved in dimethyl formamide within 30 minutes at 50° C. The relative viscosity is 1.92/25° C.

The 1,6-hexamethylene-bis-semicarbazide is obtained in form of needles by catalytic reduction of the carbobenzoxy compound (M.P. 68–69° C.) prepared from carbobenzoxyhydrazine and 1,6-hexa methylene diisocyanate (M.P. 168–169° C.).

EXAMPLE 5

About 350 parts of an ethylene glycol/adipic acid polyester having a molecular weight about 2,100 are reacted with about 84 parts of 4,4'-diphenyl methane diisocyanate in about 200 ml. of benzene as described in Example 1 and dissolved in about 434 parts of dimethyl formamide. The 50% solution which is obtained contains 1.41% of free isocyanate groups.

About 150 parts of this 50% polyester isocyanate solution are mixed with an equivalent quantity, about 2.26 parts of carbodihydrazide in about 125 parts of dimethyl formamide as a solution at a temperature of about 60° C. A substantially 20.5% solids solution having a viscosity of about 100 cps./20° C. is obtained with a rise in viscosity. When this solution is spun into hot water as described in Example 1, highly elastic filaments are obtained having a denier of 143, a tensile strength of 0.55 g./den., an elongation of 750% and a permanent elongation of 3.5%. The modulus (100%) is 0.032 g./den. and the tension drop (100%) is 8.1%.

EXAMPLE 6

2,800 parts of a polyester prepared from ethylene glycol and adipic acid and having an OH number of 55.6 and an acid number of 1.85 are dehydrated in vacuo at 130° C. for 1 hour and then a solution of 556 parts of 4,4-diphenyl methanediisocyanate in 840 parts of chlorobenzene is added and the mixture heated to 95–100° C. for 2 hours. After cooling the reaction mixture has a viscosity of 350 poises/20° C. and an NCO content of 1.615%. 308 parts of a solution of 1.73 parts of carbodihydrazide in 12.27 parts of water and 294 parts of dimethyl formamide are continuously reacted at room temperature with 100 parts of the above solution. From a container being under a pressure of 8 atm. 100 g. per minute of the polyester-isocyanate-solution are introduced by a gear pump into a head of a double screw running with 150 rotations per minute. At the same time 308 g./minute of the carbodihydrazide solution are injected by means of an injection nozzle with a pressure of 120 atm. Through a third inlet a 50% pigment paste is added by a gear pump at a rate of 8 g./minute at the end of the first third of the double screw.

The pigment paste is prepared from 2 parts of titanium dioxide, 1 part of dimethyl formamide and 1 part of the above elastomer solution by mixing the ingredients in a ball mill for several hours. The paste can also be made on a roller. After a time of stay of about 30 sec. a 20% solution of an elastomer containing about 5% (calculated on the solid content) of pigment is obtained at the outlet of the double screw. The solution has a viscosity of 135 poises/20°.

If instead of the equivalent amount of carbodihydrazide solution (308 parts) an excess is injected viscosity and molecular weight of the elastomer solution are decreased. If 315 g. of carbodihydrazide solution are employed the elastomer solution shows a viscosity of only 24 poises/20°. After the removal of the solvent the elastomer itself shows a relative viscosity (10 g./l. dissolved in hexamethyl phosphorous amide) of 2.41 and 1.95 respectively.

The elastomer solutions can be concentrated if desired by means of a film evaporator. A solution with a viscosity of 400 poises/20° and with a solid content of 25.7% is spun at a rate of 12.9 g./minute through a spinnerette with 24 nozzles of a diameter of 0.15 mm. into a 5 m. tunnel heated to 220° C. Air of 240° is blown into the tunnel as a counter stream. The multifil is wound at a rate of 200 m./min. after talcum has been applied onto the filaments. After removing the talcum by 10 minutes washing with water at 35° C. the following properties are observed.

| | | |
|---|---|---|
| Count | den | 138 |
| Elongation | percent | 680 |
| Permanent elongation after 300% expansion and 30 sec. of relaxation | do | 10 |
| Modulus (300%) | g./den | 1.167 |
| Tensile strength | g./den | 0.60 |

Highly elastic filaments are also obtained by spinning into hot water in accordance with Example 1. The properties are similar to the above properties.

The elastomer solution can also be applied to a fabric by means of a doctor. After drying at 100° C. a coating is obtained with high elasticity and high resistance against rubbings.

The solution can be cast onto glass plates. After evaporation of the solvent at 70–100° C. highly elastic foils are obtained which exhibits the following properties.

| | | |
|---|---|---|
| Thickness | mm | 0.20 |
| Tensile strength | kg./cm.$^2$ | 490 |
| Elongation | percent | 775 |
| Modulus (20%) | kg./cm.$^2$ | 7 |
| Modulus (300%) | kg./cm.$^2$ | 88 |
| Shore hardness | | 59 |
| Resistance to further tearing acc. to Graves | kg./cm | 81 |

EXAMPLE 7

About 300 parts of a polyester urethane having a molecular weight of 2,000 and prepared from 1 mol of hexanediol/adipic acid polyester having a molecular weight of 900 and 0.5 mol of toluylene diisocyanate, which has been dehydrated by heating for 1 hour in vacuo at 130° C., are converted with about 71.9 parts of 4,4'-diphenyl methane diisocyanate into the polyester isocyanate which is diluted with about 385 parts of dimethyl formamide to a 50% solution containing 1.41% of free isocyanate.

About 125 parts of this solution are diluted with about 150 parts of dimethyl formamide and mixed with about 1.89 parts of carbodihydrazide, which is equivalent to the —NCO groups, in about 112 parts of dimethyl formamide while stirring vigorously. The substantially 16.5% solids solution becomes more viscous (24 poises/20° C.). The solution is spun as described in Example 1. Excellent elastic filaments having the following properties are thus obtained:

| | | |
|---|---|---|
| Count | den__ | 146 |
| Tensile strength | g./den__ | 0.90 |
| Elongation | percent__ | 525 |
| Permanent elongation | do____ | 4.8 |
| Modulus (100%) | g./den__ | 0.073 |

After boiling for about 6 hours in 5% soda solution, the filaments still have a tensile strength of 0.57 g./den. with an elongation of 570% and a permanent elongation of 5%.

EXAMPLE 8

About 125 parts of the polyester isocyanate solution obtained as decribed in Example 7 are diluted with about 75 parts of dimethyl formamide and reacted with about 1.95 parts of carbodihydrazide in about 112.5 parts of dimethyl formamide. This quantity of carbodihydrazide is 103% of the quantity calculated on —NCO content. A less viscous (40 poises/20° C.) and more cencentrated (20.5%) solution is obtained from which filaments having the following properties can be obtained by spinning into water at a temperature of about 90° C.:

| | | |
|---|---|---|
| Count | den__ | 186 |
| Tensile strength | g./den__ | 0.66 |
| Elongation | percent__ | 500 |
| Permanent elongation | do____ | 5.6 |
| Modulus (100%) | g./den__ | 0.072 |

EXAMPLE 9

By reacting about 125 parts of the 50% polyester isocyanate solution of Example 7, diluted with about 75 parts of dimethyl formamide with about 1.83 parts of carbodihydrazide and 126 mg. of di-n-butyl amine, which is 197% and 3% respectively of the quantity calculated on the existing —NCO groups, in about 113 parts of dimethyl formamide, the result is a solution of low viscosity (about 1 poise/20° C.) with a solid content of about 20.4%. Filaments spun from this solution as described in Example 1 have a count of 184, a tensile strength of 0.60 g./den., and elongation of 550%, a permanent elongation of 3.9% and a modulus (100%) of 0.053 g./den.

EXAMPLE 10

About 300 parts of an ethylene glycol/adipic acid ester having a molecular weight of 2,000 and which had been dehydrated by heating for 1 hour in vacuo at about 130° C. are converted in benzene with about 131.3 parts of 4,4'-diphenyl methane diisocyanate, the molar ratio being about 1:3.5, and subsequently diluted with about 427 parts of dimethyl formamide into a 50% polyester isocyanate solution having an —NCO content of about 3.36%.

A solution at a temperature of about 80° C. and consisting of about 5.40 parts of carbodihydrazide in about 150 parts of dimethyl formamide is quickly stirred into about 150 parts of the first-mentioned 50% solution, diluted with about 150 parts of dimethyl formamide, a solution of low viscosity and a solid content of about 17.5% being obtained. Spinning of the filaments into hot water with a descent path of about 2 meters gives elastic filaments having the following properties:

| | | |
|---|---|---|
| Count | den__ | 178 |
| Tensile strength | g./den__ | 0.45 |
| Elongation | percent__ | 525 |
| Permanent elongation | do____ | 13 |
| Modulus (100%) | g./den__ | 0.094 |

EXAMPLE 11

About 250 parts of a polyester of ethylene glycol and adipic acid having a molecular weight of 2,000 and dehydrated by heating for 1 hour in vacuo at about 130° C. and about 0.233 part of trimethylol ethane are mixed with about 61.5 parts of a solution of 4,4'-diphenyl methane diisocyanate in about 250 ml. of benzene. The benzene is distilled off over a period of about 1 hour and then the substance is heated for about 2 hours in a boiling water bath. After stirring in about 300 parts of dimethyl formamide at about 30° C. the resulting solution has 1.38% —NCO.

About 150 parts of this solution, diluted with about 75 parts of dimethyl formamide, are transformed into a substantially 20.5% solids solution of relatively low viscosity (100 cps./20° C.) by dropwise addition of a solution at a temperature of about 60° C. and consisting of about 1.85 parts, an equivalent quantity, of carbodihydrazide in about 113 parts of dimethyl formamide. When the solution, which is formed, is spun into an aqueous precipitation bath at a temperature of about 90° C,. elastic filaments having the following properties are obtained:

| | | |
|---|---|---|
| Count | den__ | 186 |
| Tensile strength | g./den__ | 0.50 |
| Elongation | percent__ | 650 |
| Permanent elongation | do____ | 4 |

EXAMPLE 12

About 40 parts of a polyester urethane obtained as described in Example 7 are heated with 11.67 parts of 4,4'-diphenyldimethylmethane diisocyanate (mol proportion 1:2.1) and about 40 parts benzene while distilling off the solvent. The mixture is heated to 96–100° C. for 2 hours. After cooling the melt 50 parts of dioxane are added. The resulting 50% solution contains 1.75% free NCO groups.

59 parts of this 50% dioxane solution are diluted with 59 parts of dimethyl acetamide and reacted with a solution of 2.54 parts (equimolar amount) of 1,4-butanediol-bis-hydrazine-carboxylic acid ester in 94 parts of dimethyl acetamide. The solution reaches within 2 minutes a viscosity of 22 poises/20°.

Filaments having the following properties can be obtained by spinning into water at a temperature of about 90° C.:

| | | |
|---|---|---|
| Count | den__ | 150 |
| Tensile strength | g./den__ | 0.68 |
| Elongation | percent__ | 450 |
| Permanent elongation | do____ | 6 |

The 1,4-butanediol-bis-hydrazine carboxylic acid ester is prepared by slowly adding 1,4-butanediol-bis-chlorocarbonic acid ester to an excess of hydrazine hydrate at 0° C. and filtering off the polymeric material. The desired ester separates out of the filtrate in needles M.P. 125–127° C.

EXAMPLE 13

500 parts of the polyester urethane obtained as described in Example 7 are reacted at 100° C. for 2 hours with 146 parts of 4,4'-diphenyldimethylmethane diisocyanate (mol ratio 1:2.1). The product is diluted with 634 parts of dimethyl formamide to a solution with 1.64% free NCO groups.

400 parts of the polyester-isocyanate-solution are diluted with 330 parts of dimethyl formamide and reacted with a warm solution of 6.78 parts of carbodihydrazide (equivalent amount) in 350 parts of dimethylformamide while stirring. The 50% solution thus obtained is concentrated in a vacuum of 12 Torr at 70° C. to a solid content of 25%. The viscosity is 175 poises/20°.

Filaments can be obtained from the solution by spinning into hot water in accordance to Example 1 or by spinning through a heated tunnel. The solution is by means of a pump spun through an 8-aperture spinnerette provided with holds having a diameter of 0.20 mm. into a 4 m. tunnel heated to 175° C. Air of 180–185° is blown into the tunnel from below. The filament is after talcum has been applied wound with 50–150 m./minute.

If the solution is spun through a heated tunnel with a rate of 2.4 ml./minute (a) or 4.8 ml./minute (b) and the filament wound with 150 m./minute (A) or 70 m./minute (B) filaments with following properties are obtained.

|  | A | B |
|---|---|---|
| Count (den.) | 40 | 152 |
| Tensile strength (g.den.) | 0.45 | 0.78 |
| Elongation (percent) | 420 | 505 |
| Permanent elongation (percent) | 5 | 6 |
| Modulus 100% elongation (g./den.) | | 0.040 |

Foils which are obtained by pouring the solution onto sheets of glass and evaporating off the solvent have the following properties:

Tensile strength _____ kg./cm.$^2$__ 875
Elongation _____ percent__ 460
Tension value:
　At 20% elongation_____ kg./cm.$^2$__ 11–12
　At 300% elongation_____ kg./cm.$^2$__ 190
Resistance to further tearing according to
　Graves _____ kg./cm__ 50–58

EXAMPLE 14

200 parts of the polyester urethane prepared as described in Example 7 are mixed with 33.6 parts of 1,6-hexamethyldiisocyanate (mol ratio 1:2). The mixture is heated for 3 hours to 100°. After cooling 250 parts of dimethyl formamide are added. 200 parts of the 50% solution (NCO number 1.8) are diluted with 270 parts of dimethyl formamide. 14 parts of additive (60% paste of titanium dioxide and talcum in a ratio of 2.5:1 with dimethyl formamide) are added. Then 3.85 parts of carbodihydrazide (equivalent amount) in 200 parts of dimethyl formamide are added. The viscosity of the 18.5% solution is increased within 30 minutes to 19 poises/20° C.

Filaments having the following properties can be obtained by spinning into hot water according to Example 1.

Count _____ den__ 166
Tensile strength _____ g./den__ 0.65
Elongation _____ percent__ 550
Permanent elongation _____ do____ 4

EXAMPLE 15

100 parts of the polyester of Example 4 are dehydrated in vacuo at 130° C. for 1 hour and then heated with 25 parts of 4,4'-diphenyl methane diisocyanate for 50 minutes to 110° C. 375 parts of dimethyl formamide are added to the melt. The solution contains 0.55% free NCO.

225 parts of the polyester isocyanate solution thus obtained are cooled to 5° C. Then a solution of 4.65 parts of 1,4-phenylene-bis-ethyl ether carbazine acid ester in 115 parts of dimethyl formamide are added. The viscosity is increased very rapidly.

Filaments can be spun from the 21% solution having the following properties:

Count _____ den__ 194
Tensile strength _____ g./den__ 0.62
Elongation _____ percent__ 710
Permanent elongation _____ do____ 3.5
Modulus (100%) _____ g./den__ 0.04

A foil can be made by casting the solution in a layer of a thickness of 0.4 mm. and evaporating the solvent. The properties are as follows:

Thickness _____ mm__ 0.08
Tensile strength _____ kg./cm.$^2$__ 550
Elongation _____ percent__ 630
Tension value:
　At 20% elongation_____ kg./cm.$^2$__ 13.7
　At 300% elongation_____ kg./cm.$^2$__ 58.2
Resistance to further tearing according to
　Graves _____ kg./cm__ 46.0
Shore hardness _____ 54

The 1,4-phenylene-bis-ethyl ether carbazine acid ester is prepared by catalytic hydrogenation with Pd of 25.5 parts of carbobenzoxy-1,4-phenylene-bis-ethyl ether carbazine acid ester in 500 parts of methanol and 350 parts of dimethyl formamide. 10.6 parts of product M.P. 176–177° C. are obtained. In the manufacture of the carbobenzoxy compound 43.5 parts of carbobenzoxy hydrazine are reacted in 130 parts of dioxane and 55 parts of pyridine at 5° C. with 42 parts of 1,4-phenylene-bis-ethyl ether chloro carbonic acid ester in 95 parts of dioxane. The reaction mixture is acidified, the precipitate filtered off and washed free of chlorine. The crude material is recrystallized from ethanol. Melting point 157° C. The 1,4-phenylene-bis-ethyl ether chloro carbonic acid ester is obtained from 1,4-phenylene-bis-oxethyl ether and phosgene.

EXAMPLE 16

400 parts of the polyester of Example 4 are dehydrated in vacuo at 130° C. and then heated for 50 minutes to 110° C. with 71.2 parts of toluylene diisocyanate (2.4 and 2.6 isomers 65:35). 250 parts of dry chlorobenzene are added to the melt and the solution thus obtained is diluted at 10° C. with 475 parts of dimethyl formamide. The NCO content is 1.27%.

225 parts of the polyester isocyanate solution are cooled to 5° C. While stirring a solution of 5.95 parts of ethylene-bis-semicarbazide in 20 parts of water is added within 5 minutes. The viscosity of the solution increases rapidly.

The solution is concentrated by removing the solvent in vacuo to 28.7%. The viscosity is then 220 poises/20° C.

A foil can be made by casting the solution in a layer of a thickness of 0.4 mm. and evaporating the solvent. The properties are as follows:

Thickness _____ mm__ 0.10
Tensile strength _____ kg./cm.$^2$__ 480
Elongation _____ percent__ 660
Tension value:
　At 20% elongation_____ kg./cm.$^2$__ 23
　At 300% elongation_____ kg./cm.$^2$__ 137
Resistance to further tearing
　according to Graves _____ kg./cm__ 56
Shore hardness _____ 72

The ethylene-bis-semicarbazide is made as follows: 60 parts of ethylene-bis-carbamic acid phenylester are added at 60° C. to 100 parts of hydrazine hydrate. The reaction mixture is held at 60° C. for 1 hour. After cooling the separated product is filtered off and recrystallized from water and ethanol M.P. 168° C.

EXAMPLE 17

222 parts of the polyester isocyanate solution of Example 1 (NCO content 1.38%) are diluted with 130 parts of dimethyl formamide. A solution of 1.06 parts of N,N'-piperazine dicarbonic acid dihydrazide and 4.60 parts of succinic acid dihydrazide in 20 parts of water are added at 5° C. The viscosity of the solution is increased rapidly. The solution is concentrated in vacuo to 35.8%, the viscosity is 180 poises/20° C.

A foil can be made by casting the solution in a layer of a thickness of 0.4 mm. and evaporating the solvent. The properties are as follows:

Thickness _____ mm__ 0.10
Tensile strength _____ kg./cm.$^2$__ 185
Elongation _____ percent__ 770
Tension value:
　At 20% elongation_____ kg./cm.$^2$__ 10.6
　At 300% elongation_____ kg./cm.$^2$__ 28.3
Resistance to further tearing according
　to Graves _____ kg./cm__ 17.3

N,N'-piperazine-dicarbonic acid dihydrazide is obtained by heating for 1 hour of 97.8 parts of N,N'-piperazine-dicarbonic acid diphenyl ester in 150 parts of hydrazine hydrate and 400 parts of dimethyl formamide to 60° C. After cooling the product crystalizes out, is washed with isopropanol and recrystallized from water, M.P. 213° C.

EXAMPLE 18

100 parts of a polyacetal from 50 mol percent 1,6-hexanediol, 50 mol percent methylhexanediol-1,6 and formaldehyde (OH-number 164) are dehydrated in vacuo at 110° C. for 1 hour and then heated for 30 minutes to 100° C. with 17.2 parts of toluylene diisocyanate. After addition of 25 parts of 4,4'-diphenylmethane diisocyanate the melt is held for 30 minutes at 100° C. After dilution of the melt with 120 parts of dioxane and with 400 parts of dimethyl formamide the NCO content is 0.51%.

550 parts of the polyacetal isocyanate solution are cooled to 15° C. then while stirring a solution of 3 parts of carbodihydrazide in 150 parts of dimethyl formamide (70° C.) is added. The viscosity of the solution increases strongly. The 17.2% solution thus obtained is spun to give colorless highly elastic filaments having the following properties:

| | | |
|---|---|---|
| Count | den__ | 106 |
| Tensile strength | g./den__ | 0.49 |
| Elongation | percent__ | 645 |
| Permanent elongation | do____ | 7.6 |
| Modulus (300%) | g./den__ | 0.172 |
| Modulus (150%) | g./den__ | 0.098 |

A foil can be made by casting the solution in a layer of a thickness of 0.7 mm. and evaporating the solvent. The properties are as follows:

| | | |
|---|---|---|
| Thickness | mm__ | 0.11 |
| Tensile strength | kg./cm.$^2$__ | 390 |
| Elongation | percent__ | 635 |
| Tension value: | | |
| At 20% elongation | kg./cm.$^2$__ | 16.3 |
| At 300% elongation | kg./cm.$^2$__ | 110.6 |
| Resistance to further tearing according to Graves | kg./cm__ | 15.6 |
| Shore hardness | | 52 |

EXAMPLE 19

50 parts of a polyester acetal prepared from an adipic acid-bis-hydroxyhexylester and formaldehyde (OH-number 97) are dehydrated in vacuo at 110 C. for 1 hour and then heated for 30 minutes to 100° C. with 3.8 parts of toluylene diisocyanate (isomer mixture of 2.4 and 2.6 65:35). After addition of 11.05 parts of 4,4'-diphenylmethane diisocyanate the melt is held for 45 minutes at 100° C. 60 parts of absolute dioxane and then 140 parts of dimethyl formamide are added to the melt. The NCO content of the solution is 0.48%.

225 parts of the polyester acetal isocyanate solution are cooled to 15° C. While stirring a solution of 1.15 parts of carbodihydrazide in 10 parts of water and 100 parts of dimethyl formamide are added. The viscosity of the solution is increased to about 100 poises/20° C. The substantially 16.7% solution thus obtained was spun to give colorless highly elastic filaments having the following properties:

| | | |
|---|---|---|
| Count | den__ | 105 |
| Tensile strength | g./den__ | 0.53 |
| Elongation | percent__ | 600 |
| Modulus (300%) | g./den__ | 0.155 |
| Modulus (150%) | g./den__ | 0.095 |

A foil can be made by casting the solution in a layer of a thickness of 0.7 mm. and evaporating the solvent. The properties are as follows:

| | | |
|---|---|---|
| Thickness | mm__ | 0.11 |
| Tensile strength | kg./cm.$^2$__ | 470 |
| Elongation | percent__ | 590 |
| Tension value: | | |
| At 20% elongation | kg./cm.$^2$__ | 8.6 |
| At 300% elongation | kg./cm.$^2$__ | 95 |
| Resistance to further tearing according to Graves | kg./cm__ | 25.6 |
| Shore hardness | | 55 |

It is, of course, to be understood that any of the particular reaction components such as the isocyanates, polyhydroxyl compounds, or the compounds represented by the general formula set forth above and also any of the inert solvents may be substituted into the working examples for the particular compounds utilized therein and that the scope of the invention is not to be limited by these examples.

Although the invention has been described in considerable detail for the purpose of illustration, it is to be understood that variations may be made therein by those skilled in the art without departing from the spirit of the invention and the scope of the claims.

What is claimed is:

1. A polyurethane polymer solution for the manufacture of fibers, foils and coatings which comprises the reaction product in an inert polar solvent that will dissolve polyacrylonitrile of (1) a substantially linear isocyanate terminated polymer prepared by reacting (a) an organic compound containing active hydrogen atoms which are reactive with NCO groups, with (b) an excess of an organic diisocyanate, said polymer (1) having a molecular weight of from about 700 to about 5,000 with (2) a dihydrazide having at least two hydrogen atoms and having the formula R—NH—NR'—A—(Z—A)$_n$—NR'—NH—R wherein A is a member selected from the group consisting of —CO—, —CS—, and —SO$_2$—, R and R' are members selected from groups consisting of hydrogen, aryl and alkyl, Z is a radical selected from the group consisting of alkylene, arylene, cycloalkylene, —NH—, —NH—NH—, —OYO— and —NH—Y—NH—, where Y is a divalent organic radical selected from the group consisting of alkylene and phenylene and $n$ is a member selected from the group consisting of 0 and 1, the hydrazide (2) being employed in a quantity of from 100 mol percent to about 110 mol percent of that required to react with the NCO groups of the polymer (1) said reaction of (1) and (2) being conducted in said inert solvent.

2. The polyurethane polymer solution of claim 1 wherein the organic compound containing active hydrogen atoms which are reactive with —NCO groups is selected from the group consisting of hydroxyl polyesters, polyhydric polyalkylene ethers, polyester amides, polyhydric polythioethers, polycarbonates and polyacetals.

3. A polyurethane fiber, foil or coating prepared by the process which comprises shaping the polymer solution of claim 1 to the desired configuration while removing the solvent.

4. The polyurethane polymer solution of claim 1 wherein the hydrazide is carbodihydrazide.

5. The polyurethane polymer solution of claim 1 wherein the organic compound having active hydrogen atoms has a melting point of less than 60° C.

6. The polyurethane polymer solution of claim 1 wherein the hydrazide is an aliphatic dicarboxylic acid dihydrazide.

7. The polyurethane polymer solution of claim 1 wherein the solvent is selected from the group consisting of dimethyl formamide, dimethyl acetamide, dimethyl propionamide, tetramethylene sulfone, N-methyl pyrollidone, dimethyl sulphoxide, and hexamethyl phosphorous amide.

8. The polyurethane polymer solution of claim 1 wherein the organic compound having active hydrogen atoms is a dihydroxyl polyester.

9. The polyurethane polymer solution of claim 1 wherein the organic compound having active hydrogen atoms is a polyalkylene ether glycol.

10. The polyurethane polymer solution of claim 1 wherein the organic compound having active hydrogen atoms is a dihydric polyacetal.

11. A substantially linear polyurethane polymer prepared by reacting:
 (A) a prepolymer prepared by reacting (i) an organic diisocyanate and (ii) a polymeric glycol having a molecular weight between about 700 and about 5,000, and
 (B) carbodihydrazide.

12. A substantially linear polyurethane polymer prepared by reacting:
 (A) a prepolymer prepared by reacting (i) an organic diisocyanate and (ii) a polymeric glycol having a molecular weight between about 700 and about 5,000, and
 (B) oxalyl dihydrazide.

References Cited

UNITED STATES PATENTS

| | | | |
|---|---|---|---|
| 2,865,932 | 12/1958 | MacMuller | 260—349 |
| 2,795,517 | 6/1957 | Lowe | 260—77.5 |
| 2,764,599 | 9/1956 | Clifford | 260—349 |
| 2,725,366 | 11/1955 | Seeger | 260—75 |
| 3,014,009 | 12/1961 | Levine | 260—47 |
| 2,929,800 | 3/1960 | Hill | 260—77.5 |
| 2,957,852 | 10/1960 | Frankenburg et al. | 260—75 |
| 3,004,945 | 10/1961 | Farago | 260—30.8 |
| 3,202,636 | 8/1965 | Wendemuth et al. | 260—75 |
| 3,216,975 | 11/1965 | Kunde et al. | |
| 3,305,533 | 2/1967 | Thoma et al. | 260—75 |
| 3,149,998 | 9/1964 | Thurmaier | 260—77.5 |

FOREIGN PATENTS

| | | |
|---|---|---|
| 1,112,409 | 9/1954 | France. |
| 1,123,467 | 2/1962 | Germany. |

DONALD E. CZAJA, *Primary Examiner.*

M. B. FEIN, *Assistant Examiner.*

U.S. Cl. X.R.

260—30.4, 30.6, 30.8, 31.2, 31.6, 32.6, 32.8, 33.8, 37, 40, 67, 75, 77.5